United States Patent
Daviller et al.

(12) 
(10) Patent No.: US 6,403,045 B1
(45) Date of Patent: Jun. 11, 2002

(54) METHOD FOR TREATING RESIDUES RESULTING FROM THE PURIFICATION OF GARBAGE AND/OR INDUSTRIAL WASTE INCINERATION FUMES

(75) Inventors: Daniel Daviller, Poizat; Laurent Rizet, Viuz en Sallaz, both of (FR)

(73) Assignee: FIBAC, Grenoble (FR)

(*) Notice: Subject to any disclaimer, the term of this patent is extended or adjusted under 35 U.S.C. 154(b) by 0 days.

(21) Appl. No.: 09/445,426

(22) PCT Filed: Jun. 10, 1998

(86) PCT No.: PCT/FR98/01179

§ 371 (c)(1),
(2), (4) Date: Mar. 14, 2000

(87) PCT Pub. No.: WO98/56464

PCT Pub. Date: Dec. 17, 1998

(30) Foreign Application Priority Data

Jun. 11, 1997 (FR) .............................................. 97 07219

(51) Int. Cl.⁷ ................................................. C01D 7/00
(52) U.S. Cl. ......................... 423/209; 423/92; 423/98; 423/105; 423/164
(58) Field of Search ........................... 423/92, 98, 105, 423/164, 209

(56) References Cited

U.S. PATENT DOCUMENTS 4,764,284 A * 8/1988 Jansen ....................... 210/715

FOREIGN PATENT DOCUMENTS

| EP | 0 538 598 | 4/1993 | ............ A62D/3/00 |
| JP | 50-021565 | 3/1975 | |
| JP | 54-037365 | 3/1979 | ............ C02C/5/02 |
| JP | 57-042388 | 3/1982 | ............ B09B/3/00 |
| JP | 58-089988 | 5/1983 | ............ C02F/1/70 |

* cited by examiner

*Primary Examiner*—Steven P. Griffin
*Assistant Examiner*—Maribel Medina Sanabria
(74) *Attorney, Agent, or Firm*—Jacobson Holman, PLLC

(57) ABSTRACT

A method for treating residues derived from garbage and/or industrial waste incineration fumes including the steps of desalting the residues by washing with sodium carbonate in sufficient amount or slightly in excess to solubilize all the salts including the sulphates and precipitate the soluble calcium, the pH being higher than 11, then carrying out a solid/liquid separation to obtain a desalinated cake; leaching the desalinated cake with sodium carbonate in sufficient amount or slightly in excess to obtain, by reaction with the lime present in the cake or added thereto if necessary, the alkalinity required for solubilising amphoteric metals, the pH being higher than 12, and obtaining by solid/liquid separation a cake and a supernatant which is neutralised with carbon dioxide, and filtering the recovered solution to obtain metal hydroxide sludge and an aqueous sodium carbonate solution; and neutralising the resulting residues at a pH between 6.5 and 8.5.

20 Claims, 2 Drawing Sheets

METHOD FOR TREATING RESIDUES RESULTING FROM THE PURIFICATION OF GARBAGE AND/OR INDUSTRIAL WASTE INCINERATION FUMES

BACKGROUND OF THE INVENTION

1. Field of the Invention

The invention relates to a method of treating residues after purification of fumes from incinerated household rubbish and/or industrial waste.

2. Descrition of the Related Art

Incineration plants convert household rubbish into clinker together with dust-laden fumes containing noxious gases. The fumes are generally purified with lime, thus capturing hydrogen chloride and sulphur-containing gases and converting them into chloride of lime and calcium sulphate, whereas heavy metals in the fumes are adsorbed on the surface of the lime particles. The products obtained at the filter outlet after the said treatment with lime together constitute the residues, which are at present discharged or stored at places conforming to national, European or international regulations.

These residues accordingly comprise products resulting from reaction with lime, adsorbed amphoteric heavy metals, calcium carbonate, lime and products resulting from incineration and captured by treatment with lime and in the form of inert dust (for example silica and alumina).

The composition or various constituents of these residues depends of course on the nature of the incinerated rubbish and waste and on the method of treatment of the fumes.

With regard to pollution, the following three categories of residues are distinguished:

substances free from polluting products;

substances containing noxious or polluting products but in stable form, that is without risk to the external environment, and substances containing harmful elements which are transferable to the external environment; these make up about 2% by weight of the residues.

As the skilled man will understand, this latter category is a potential source of pollution. It consists inter alia of heavy metals which are accessible and therefore capable of contaminating the external environment, and gives rise to present regulations requiring storage at suitable places.

SUMMARY OF THE INVENTION

One aim of the invention therefore is to provide a process for treating the residues after purification of fumes from incinerated household rubbish and or industrial waste so as to extract heavy metals and recycle the maximum proportion of reagents.

Another aim of the invention is to provide a said process for also separating the various elements in the residues in order to make optimum use of them, recycle them or dispose of them in accordance with the regulations in force.

An additional aim is to provide a method of this kind for using carbon dioxide emitted for example by incineration plants.

Another aim of the invention is to provide a said method for making optimum use of the products obtained, at minimum cost.

These aims, together with others which will appear hereinafter, are addressed by a method of processing residues after purification of fumes from incinerated household rubbish and/or industrial waste in accordance with the invention and characterized in that it comprises the following steps:

A—the residues are desalted by washing with sodium carbonate in sufficient quantity or slightly In excess for solubilising all the salts including the sulphates and for precipitating the soluble calcium, the pH being above 11, followed by separation of solids from liquids to obtain a desalinated cake;

B—the cake from step A is leached with sodium carbonate in sufficient quantity or slightly in excess for reacting with the lime present in the cake, or added if necessary, to obtain the alkalinity necessary for solubilisation of amphoteric metals, the pH being approximately 14, the solids being separated from liquids so as to obtain a cake and a superatant which is neutralised with carbon dioxide, and the recovered solution is filtered so as to obtain metal hydroxide sludge and an aqueous solution of sodium carbonate which can be recycled to the said step B, and C—the residues from step B are neutralised at a PH between 6.5 and 8.5.

Advantageously, step A is preceded by a step D of prewashing the residues with water in order to eliminate soluble calcium salts, particularly calcium chloride.

Preferably the solution from step A is neutralised by blowing in carbon dioxide and the liquids are separated from solids to obtain metal hydroxide sludge and a neutralised solution. The metal hydroxide sludge and a neutralised solution are treated in the same way. The same is done with the solution in step D. The neutralised solutions are mixed and filtered to obtain a supernatant comprising calcium chloride and sodium chloride brine and precipitated calcium sulphate or gypsum.

Advantageously a step E of washing the filter cake from step B is inserted between steps B and C in order to eliminate the maximum proportion of soda and metals remaining in the interstitial liquid. The washing solution is preferably treated by injection of carbon dioxide until the pH approaches 11. The sodium carbonate solution is advantageously recycled to step A.

The step C of neutralising the residues from step B or E is effected by injection of carbon dioxide in order to precipitate the calcium carbonates and obtain purified residues.

BRIEF DESCRIPTION OF THE DRAWINGS

The following description, which has no limitative character, should be read in connection with the accompanying drawings in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
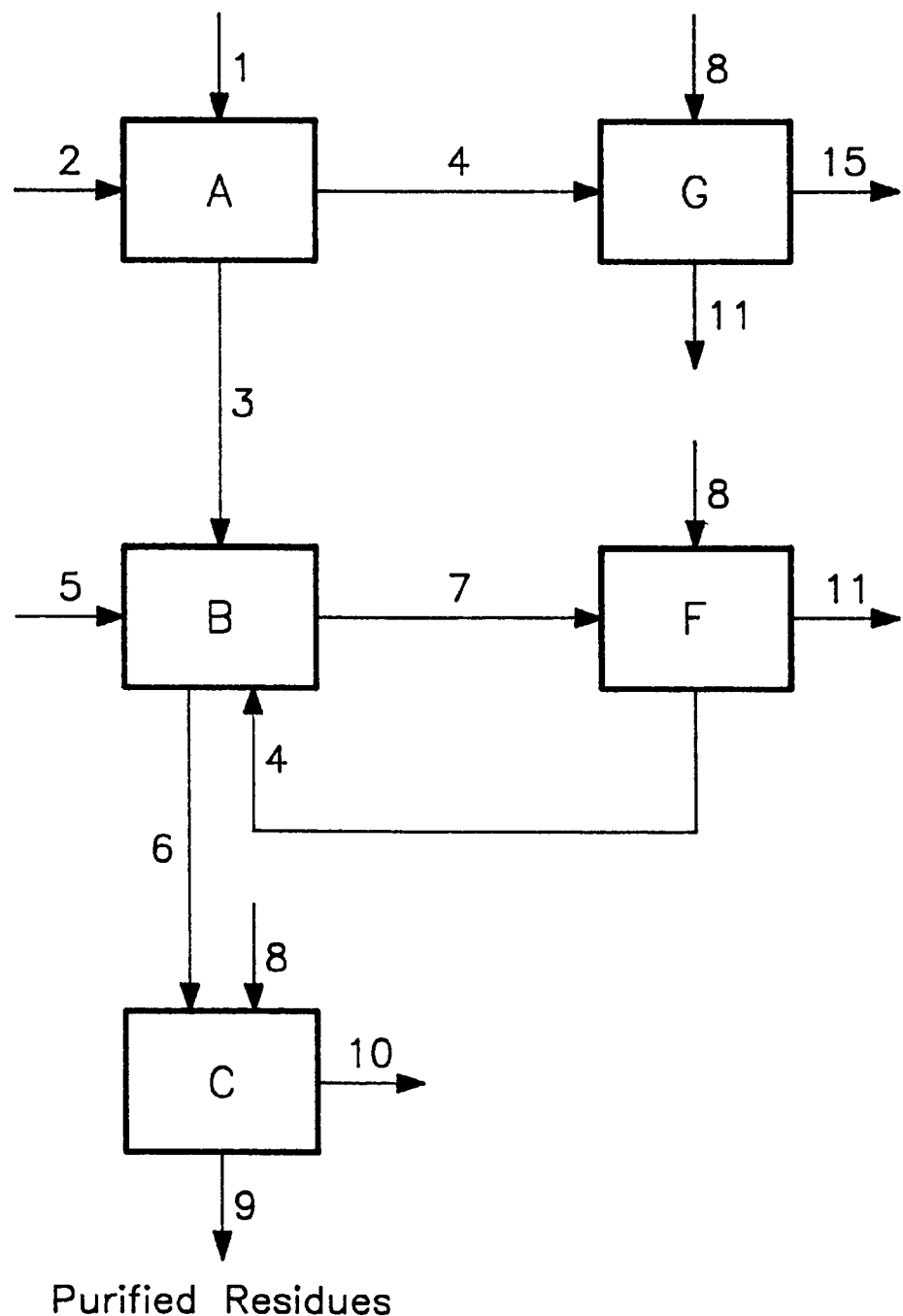
FIG. 1 is a schematic diagram of the main successive steps in a process for treating residues after purification of fumes from incinerated household rubbish and industrial waste in accordance with the invention.

As can be seen from FIG. 1, a process for treating residues after purification of fumes from incinerated household rubbish and industrial waste in accordance with the invention comprises at least three steps.

In a first step, step A, the purification residues 1 are desalted by washing with sodium carbonate 2. The amount of sodium carbonate used is the least necessary for solubilising all the salts including sulphates, that is at least the stoichiometric quantity for precipitating the soluble calcium. The pH is therefore above 11 and preferably 12. Next, solids are separated from liquids for example by filtration, thus obtaining a desalinated cake 3 and a solution 4 rich in salts.

The solution 4 rich in salts and resulting from step A is neutralised by blowing in carbon dioxide 8 (step G), at a pH between 8.5 and 9.5, preferably between 9 and 9.2. The solids are separated from liquids for example by filtration, obtaining metal hydroxide sludge 11 and a neutralised solution 15.

In a second step, step B, the desalted cake 3 from step A is leached with sodium carbonate in sufficient quantity or slightly in excess for obtaining the alkalinity necessary for solubilisation of amphoteric metals such as cadmium (Cd), lead (Pb) and zinc (Zn), that is a pH at least above 12 or even about 14. The alkalinity is obtained by reacting sodium carbonate with the lime in the residues and/or added at 5 if necessary. Next, the solids are separated from liquids, thus obtaining a cake of decontaminated residues 6 and a supernatant 7 containing the amphoteric metals.

The supernatant 7 is neutralised (step F) with carbon dioxide 8 at a pH between 11 and 11.5, preferably equal to 11, and the recovered solution is filtered, obtaining metal hydroxide sludge 11 and an aqueous solution of sodium carbonate 4 which can be recycled to the said step B.

In a third step, step C, the cake of decontaminated residues 6 from step B is neutralised by injection of carbon dioxide 8 in order to precipitate any remaining lime in the form of calcium carbonate, at a pH between 6.5 and 8.5 and preferably equal to 7.5. The solids are then separated from liquids for example by filtration, obtaining purified residues 9 and a solution of sodium hydrogen carbonate 10.

The purified residues 9 collected at the outlet of step C can be used as a filling material or inserted into an incineration furnace and converted into clinker. They are therefore useful.

Figure 2:
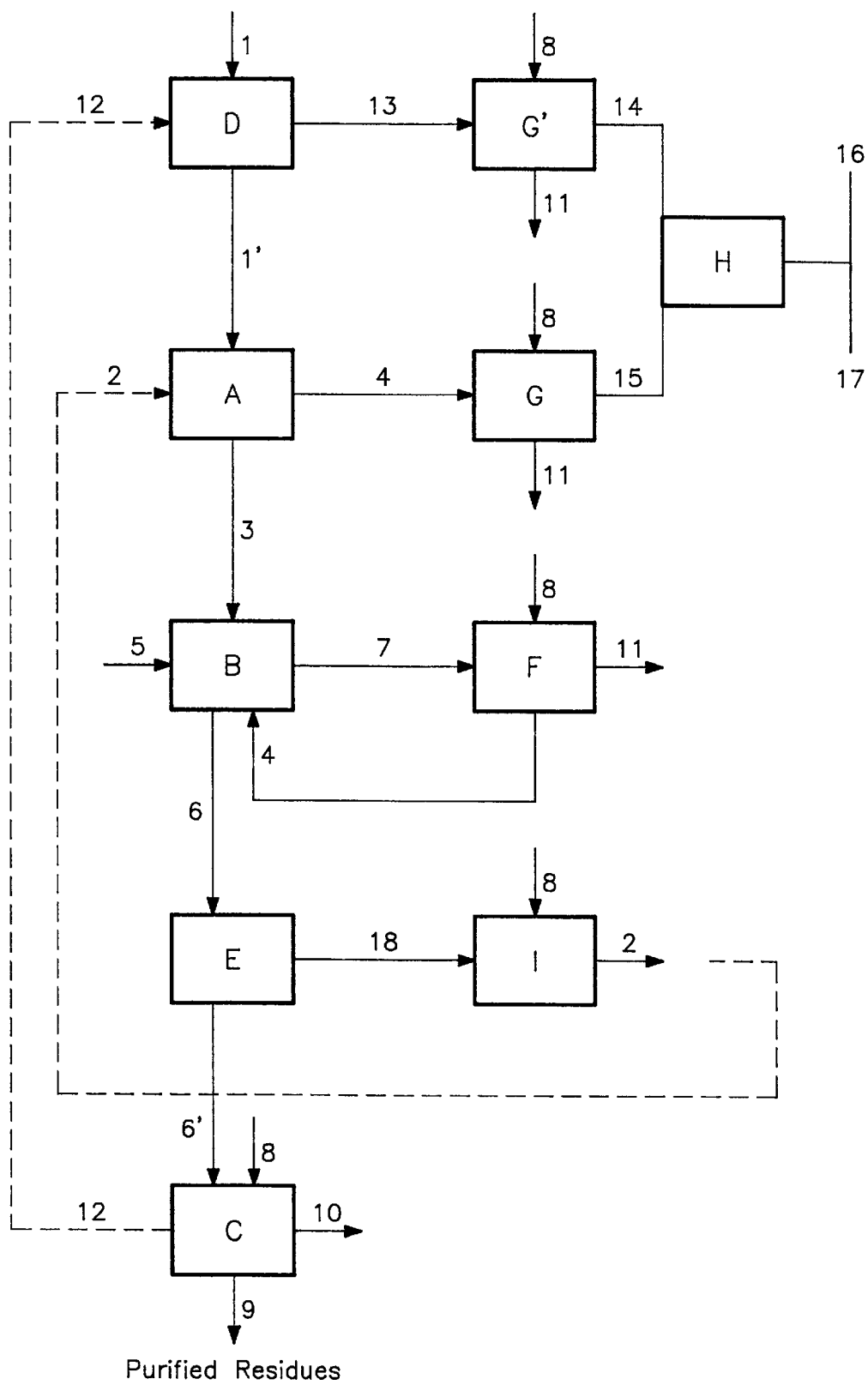
FIG. 2 is a schematic diagram showing the successive steps in an advantageous embodiment of the said method.

In the advantageous embodiment shown in FIG. 2, the process comprises steps in addition to that described previously with reference to FIG. 1.

For example it may be advantageous before step A to subject the residues after purification of incineration fumes to washing with water (step D), optionally containing sodium carbonate such as the solution 12 obtained at the outlet of step C. The liquids are separated from solids, obtaining a cake of dechlorinated residues 1' and a solution of chlorides 13. In a step G', the solution is neutralised by injection of carbon dioxide 8 at a pH between 8.5 and 9.5, preferably between 9 and 9.2, and the liquids are separated from solids for example by filtration, yielding metal hydroxide sludge 11 and a neutralised solution 14.

The neutralised solution from step G' is mixed with the solution 15 from step G, followed by separation of liquids from solids (step H) for example by filtration, obtaining a supernatant 16 comprising calcium chloride and sodium chloride brine and precipitated calcium sulphate or gypsum 17.

In a step E, the cake of decontaminated residues 6 from step B can be washed with water on a filter in order to eliminate the maximum proportion of soda and any metals remaining in the interstitial liquid. The washing solution 18 is then treated by injection of carbon dioxide 8 until the pH approaches 11 (step I). The thus-neutralised solution 2, that is containing sodium carbonate and metals, is recycled to step A. The washed cake of decontaminated residues 6' is then purified in step C.

The following Table gives the composition of the purified residues obtained from the various incineration residues subjected to the process according to the invention and having various compositions.

TABLE

| Residues after purification | | % Composition by weight | | | | | |
|---|---|---|---|---|---|---|---|
| | | Na | K | Ca | Cl | SO$_4$ | Pb | Zn |
| Dry | Before | 3 | 4.6 | 36 | 22.4 | 1.5 | 0.04 | 0.27 |
| | After | 0 | 0 | 53.75 | 0 | 0 | 0.007 | 0.088 |
| Semi-moist | Before | 0.8 | 1.6 | 16.8 | 5 | 4.4 | 0.17 | 0.57 |
| | After | 0 | 0 | 19.46 | 0 | 0 | 0.05 | 0.22 |
| Moist | Before | 0 | 0 | 10.8 | 0.64 | 4.95 | 0.4 | 1.26 |
| | After | 0 | 0 | 18.33 | 0 | 0 | 0.12 | 0.34 |

Note that in the residues treated, the proportion of heavy metals was below the present tolerances.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of treating residues after purification of fumes from incinerated household rubbish and/or industrial waste, comprising the steps of:

A—desalting residues by washing with sodium carbonate in sufficient quantity or slightly in excess for solubilising all salts including sulphates and for precipitating soluble calcium, at a pH above 11, followed by separating solids from liquids to obtain a desalinated cake and a solution;

B—leaching the desalinated cake from step A with sodium carbonate in sufficient quantity or slightly in excess for reacting with lime present in the cake, or added if necessary, to obtain an alkalinity necessary for solubilisation of amphoteric metals, at a pH above 12, solids being separated from liquids so as to obtain a decontaminated residue cake and a supernatant which is neutralised with carbon dioxide, recovered solution being filtered so as to obtain metal hydroxide sludge and an aqueous solution of sodium carbonate which can be recycled to said step B, and C—neutralising the decontaminated residue cake from step B at a pH between 6.5 and 8.5.

2. The method according to claim 1, wherein step A is preceded by a step D of pre-washing the residues with water in order to eliminate soluble calcium salts.

3. The method according to claim 2, wherein the solution from step A is neutralised by blowing in carbon dioxide and liquids are separated from solids to obtain metal hydroxide sludge and a neutralised solution.

4. The method according to claim 3, wherein a solution from step D is neutralised by blowing in carbon dioxide and liquids are separated from solids to obtain metal hydroxide sludge and a second neutralised solution.

5. The method according to claim 4, wherein the neutralised solution and second neutralised solution are mixed and filtered, resulting in a supernatant comprising calcium chloride and sodium chloride brine and precipitated calcium sulphate or gypsum.

6. The method according to claim 1, wherein a step (E) of washing the decontaminated residue cake from step B is inserted between steps B and C for maximum elimination of remaining soda and metals.

7. The method according to claim 6, wherein a washing solution collected from washing step (E) is treated by injection of carbon dioxide until the pH approaches 11, to obtain a solution of sodium carbonate.

8. The method according to claim 7, wherein the sodium carbonate solution is recycled to step A.

9. The method according to claim 6, wherein the decontaminated residue cake from step B or E is neutralised by injecting carbon dioxide in order to precipitate calcium carbonates and obtain purified residues.

10. The method according to claim 1, wherein the solution from step A is neutralised by blowing in carbon dioxide and liquids are separated from solids to obtain metal hydroxide sludge and a neutralised solution.

11. The method according to claim 1, wherein the decontaminated residue cake from step B is neutralised by injecting carbon dioxide in order to precipitate calcium carbonates and obtain a purified residue.

12. A method of treating residues after purification of fumes from incinerated household rubbish and/or industrial waste, comprising the steps of:

desalting residues by washing with sodium carbonate to solubilise salts including sulphates and precipitate soluble calcium, at a pH above 11;

separating solids from liquids to obtain a desalinated cake and a solution;

leaching the desalinated cake by reacting sodium carbonate with lime, to obtain an alkalinity necessary to solubilise amphoteric metals, at a pH above 12, and separating solids from liquids so as to obtain a decontaminated residue cake and a supernatant;

neutralising said supernatant with carbon dioxide; and filtering a recovered solution so as to obtain metal hydroxide sludge and an aqueous solution of sodium carbonate which is recycled to the step of leaching.

13. The method according to claim 12, wherein said supernatant is neutralised with carbon dioxide at a pH between 11 and 11.5.

14. The method according to claim 12, further comprising the step of neutralising the decontaminated residue cake by injection of carbon dioxide at a pH between 6.5 and 8.5.

15. The method according to claim 12, further comprising the step of neutralising the solution with carbon dioxide at a pH between 8.5 and 9.5 to obtain a neutralised solution.

16. The method according to claim 12, further comprising, before the step of desalting residues, the step of pre-washing the residues with water in order to eliminate soluble calcium salts.

17. The method according to claim 16, wherein a solution obtained from said step of pre-washing is neutralised by blowing in carbon dioxide, and liquids are separated from solids to obtain metal hydroxide sludge and a neutralised solution.

18. The method according to claim 15, further comprising, before the step of desalting residues, the step of pre-washing the residues with water in order to eliminate soluble calcium salts, wherein a second solution obtained from said step of pre-washing is neutralised by blowing in carbon dioxide, and liquids are separated from solids to obtain metal hydroxide sludge and a second neutralised solution, the second neutralised solution being mixed with said neutralised solution and filtered, resulting in a supernatant including calcium chloride and sodium chloride brine and precipitated calcium sulphate or gypsum.

19. The method according to claim 12, further comprising a step of washing the decontaminated residue cake to remove remaining soda and metals.

20. The method according to claim 19, wherein a washing solution collected from said washing step is treated by injection of carbon dioxide until the pH approaches 11, to obtain a solution of sodium carbonate.

* * * * *